(12) United States Patent
Dube et al.

(10) Patent No.: US 9,028,784 B2
(45) Date of Patent: May 12, 2015

(54) PROCESS AND SYSTEM FOR CLEANING A GAS STREAM

(75) Inventors: Sanjay Kumar Dube, Knoxville, TN (US); David James Muraskin, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 765 days.

(21) Appl. No.: 13/027,464

(22) Filed: Feb. 15, 2011

(65) Prior Publication Data
US 2012/0207658 A1  Aug. 16, 2012

(51) Int. Cl.
| | |
|---|---|
| *B01D 53/62* | (2006.01) |
| *B01D 53/78* | (2006.01) |
| *B01D 53/96* | (2006.01) |
| *B01D 53/14* | (2006.01) |
| *F23J 15/04* | (2006.01) |

(52) U.S. Cl.
CPC ............ *B01D 53/62* (2013.01); *B01D 53/1406* (2013.01); *B01D 53/1475* (2013.01); *B01D 53/78* (2013.01); *B01D 2252/102* (2013.01); *B01D 2257/504* (2013.01); *B01D 2258/0283* (2013.01); *F23J 15/04* (2013.01); *Y02C 10/04* (2013.01); *Y02C 10/06* (2013.01); *F23J 2215/50* (2013.01); *F23J 2217/50* (2013.01)

(58) Field of Classification Search
USPC .................................................. 423/220, 234
See application file for complete search history.

(56) References Cited

U.S. PATENT DOCUMENTS

| | | | |
|---|---|---|---|
| 2,106,734 A | 2/1935 | Gollmar | |
| 2,043,109 A | 6/1936 | McKee et al. | |
| 2,487,576 A | 11/1949 | Meyers | |
| 2,608,461 A | 8/1952 | Frazier | |
| 2,878,099 A | 3/1959 | Breuing et al. | |
| 3,255,233 A | 6/1966 | Kunze et al. | |
| 3,923,955 A | 12/1975 | Fattinger | |
| 4,515,760 A | 5/1985 | Lang et al. | |
| 4,847,057 A | 7/1989 | Brugerolle et al. | |
| 4,977,745 A | 12/1990 | Heichberger | |
| 4,999,031 A | 3/1991 | Gerhardt et al. | |
| 5,067,972 A | 11/1991 | Hemmings et al. | |
| 5,137,550 A | 8/1992 | Hegarty et al. | |
| 5,186,916 A | 2/1993 | Nevels | |
| 5,318,758 A | 6/1994 | Fujii | |
| 5,378,442 A | 1/1995 | Fujii et al. | |
| 5,427,759 A | 6/1995 | Heitmann | |
| 5,453,115 A | 9/1995 | Vuletic | |
| 5,462,583 A | 10/1995 | Wood et al. | |

(Continued)

FOREIGN PATENT DOCUMENTS

| | | |
|---|---|---|
| AU | 648129 | 7/1992 |
| AU | 678622 | 6/1995 |

(Continued)

OTHER PUBLICATIONS

A.C. Yeh, H. Bai: "Comparison of ammonia and monoethanolamine solvents to reduce CO2 greenhouse gas emissions" The Science of The Total Environment, vol. 338, 1999, pp. 121-133, XP002529608.

(Continued)

*Primary Examiner* — Stanley Silverman
*Assistant Examiner* — Daniel Berns
(74) *Attorney, Agent, or Firm* — Cynthia W. Flanigan

(57) ABSTRACT

The present application relates to a system and a process for gas cleaning.

11 Claims, 4 Drawing Sheets

(56) References Cited

U.S. PATENT DOCUMENTS

| | | | |
|---|---|---|---|
| 5,599,508 | A | 2/1997 | Martinelli et al. |
| 5,648,053 | A | 7/1997 | Mimura et al. |
| 5,700,311 | A | 12/1997 | Spencer |
| 5,756,058 | A | 5/1998 | Watanabe et al. |
| 5,832,712 | A | 11/1998 | Rønning et al. |
| 5,853,680 | A | 12/1998 | Iijima et al. |
| 5,979,180 | A | 11/1999 | Lebas et al. |
| 6,027,552 | A | 2/2000 | Ruck et al. |
| 6,210,467 | B1 | 4/2001 | Howard |
| 6,348,088 | B2 | 2/2002 | Chung |
| 6,372,023 | B1 | 4/2002 | Kiyono et al. |
| 6,458,188 | B1 | 10/2002 | Mace |
| 6,485,547 | B1 | 11/2002 | Iijima |
| 6,497,852 | B2 | 12/2002 | Chakravarti et al. |
| 6,506,350 | B2 | 1/2003 | Cooper et al. |
| 6,759,022 | B2 | 7/2004 | Hammer et al. |
| 6,764,530 | B2 | 7/2004 | Iijima |
| 7,022,296 | B1 | 4/2006 | Khang et al. |
| 7,083,662 | B2 | 8/2006 | Xu et al. |
| 7,128,777 | B2 | 10/2006 | Spencer |
| 7,160,456 | B2 | 1/2007 | Järventie |
| 7,255,842 | B1 | 8/2007 | Yeh et al. |
| 2003/0045756 | A1 | 3/2003 | Mimura et al. |
| 2003/0140786 | A1 | 7/2003 | Iijima |
| 2004/0123736 | A1 | 7/2004 | Torres, Jr. et al. |
| 2004/0126294 | A1 | 7/2004 | Cooper et al. |
| 2005/0169825 | A1 | 8/2005 | Cadours et al. |
| 2006/0178259 | A1 | 8/2006 | Schubert et al. |
| 2006/0204425 | A1 | 9/2006 | Kamijo et al. |
| 2007/0006565 | A1 | 1/2007 | Fleischer et al. |
| 2008/0072762 | A1 | 3/2008 | Gal |
| 2008/0178733 | A1 | 7/2008 | Gal |
| 2008/0307968 | A1 | 12/2008 | Kang et al. |
| 2009/0101012 | A1 | 4/2009 | Gal et al. |
| 2009/0155889 | A1 | 6/2009 | Handagama et al. |
| 2009/0282977 | A1 | 11/2009 | Koss |

FOREIGN PATENT DOCUMENTS

| | | |
|---|---|---|
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| DE | 469840 | 12/1928 |
| DE | 2832493 | 7/1978 |
| DE | 3633690 | 4/1988 |
| DE | 10 2005 033837 | 1/2007 |
| EP | 0243778 | 11/1987 |
| EP | 0502596 | 9/1992 |
| EP | 0553643 | 8/1993 |
| EP | 0588178 | 3/1994 |
| EP | 1759756 | 3/2007 |
| EP | 2322265 A1 | 5/2011 |
| GB | 271852 | 5/1926 |
| GB | 871207 | 6/1961 |
| GB | 899611 | 6/1962 |
| GB | 2331526 | 5/1999 |
| GB | 2454266 A | 5/2009 |
| JP | 10 202054 | 8/1998 |
| JP | 11 137960 | 5/1999 |
| KR | 100703999 B1 | 3/2007 |
| SU | 512785 | 5/1976 |
| SU | 1567251 | 5/1990 |
| WO | 98/47604 | 10/1998 |
| WO | 02/089958 | 11/2002 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2006/022885 | 3/2006 |
| WO | 2008/094777 | 8/2008 |
| WO | 2008/101293 | 8/2008 |
| WO | 2008141195 A1 | 11/2008 |
| WO | 2008/144918 | 12/2008 |
| WO | 2010/053683 | 5/2010 |

OTHER PUBLICATIONS

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of $CO_2$, $SO_2$ and $NO_x$," Int. J. Environmental Tech. and Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliminary Results" International Journal of Thermodynamics, International Centre for Applied Thermodynamics, Istanbul, TR, vol. 7, No. 4, Dec. 1, 2004, pp. 173-181.

PROCESS AND SYSTEM FOR CLEANING A GAS STREAM

FIELD OF THE INVENTION

The present application relates to methods and systems for removal of contaminants, such as carbon dioxide, from gas streams.

BACKGROUND

In the combustion of a fuel, such as coal, oil, peat, waste, etc, in a combustion plant, such as a power plant, a hot process gas is generated. Such a hot process gas, often referred to as a flue gas, contains, among other components, carbon dioxide ($CO_2$). The negative environmental effects of releasing carbon dioxide to the atmosphere have been widely recognized, and have resulted in the development of processes adapted for removing carbon dioxide from the hot process gas generated in the combustion of the above mentioned fuels.

WO 2006/022885 relates to a process for absorbing carbon dioxide from a flue gas. The process comprises treatment of the flue gas by means of conventional air pollution control processes, such as by means of particulate collectors, NOx and $SO_2$ control, acid mist capturing device etc. After the conventional air pollution control processes, the flue gas has a temperature of about 40-70° C. Subsequently, the flue gas is cooled down to, preferably, 0-25° C. by means of direct contact cooling, in which the flue gas is cooled by means of cold water. Following cooling, the flue gas is brought to a $CO_2$ absorber, in which the flue gas is brought into contact with a low temperature ammoniated slurry or solution having a low carbon dioxide content. The carbon dioxide of the flue gas is absorbed into the ammoniated slurry or solution, and a clean flue gas, containing very small amounts of pollutants and carbon dioxide, leaves the $CO_2$ absorber. The carbon dioxide rich ammoniated slurry or solution is regenerated in a regenerator, in which the carbon dioxide is stripped, at a temperature of about 50-200° C. and under high pressure, to form a concentrated carbon dioxide rich stream.

A problem of prior art processes such as the one described in WO 2006/022885 is that the clean flue gas released from the $CO_2$ absorber will contain a substantial amount of ammonia. WO 2006/022885 for example suggests a cold water wash of the flue gas before releasing it to the atmosphere. Such water wash can reduce the ammonia concentration in the clean flue gas to the range of about 100-1000 ppm, or even to the range of about 100-400 ppm, but this is still too high for discharging such a flue gas to the atmosphere. In addition, the capital costs for setting up such a process, including the appropriate equipment for water wash, are very high.

SUMMARY

The above drawbacks and deficiencies of the prior art are overcome or alleviated by a process for cleaning a gas stream containing carbon dioxide, comprising a) removing a part of the carbon dioxide contained in the gas stream by bringing the gas stream into contact with a first ammoniated liquid, to form a liquid enriched in carbon dioxide and a gas stream partly depleted in carbon dioxide;

b) removing, at least a part of, the carbon dioxide contained in the gas stream by bringing the gas stream partly depleted in carbon dioxide leaving step a) into contact with at least a second ammoniated liquid, to form a carbon dioxide depleted gas stream enriched in ammonia; and c) removing, at least a part of, the ammonia of the gas stream by bringing the carbon dioxide depleted gas stream enriched in ammonia leaving step b) into contact with the liquid enriched in carbon dioxide formed in step a), to absorb into the liquid ammonia from the gas stream, such that a carbon dioxide depleted gas stream at least partly depleted in ammonia and a liquid enriched in ammonia are formed, wherein the liquid enriched in ammonia is the first ammoniated liquid used in step a).

It should be understood that the terms "depleted" and "enriched" as used herein should not be interpreted as absolute, but as relative terms. Thus, when a liquid or gas is described as "depleted" or "enriched" in a certain component, it should be understood as the liquid has a decreased or increased content in that certain component as compared to the content prior to the depletion or enrichment. It should furthermore be understood that an ammoniated liquid or solution is a liquid or solution comprising ammonia.

In step a), a portion of the carbon dioxide contained in the gas stream is removed by absorption into the first ammoniated liquid which initially has a low content of dissolved carbon dioxide. The liquid thus formed may be a slurry or a solution which is enriched in dissolved carbon dioxide and depleted in ammonia. Precipitated solids may be removed and the liquid enriched in carbon dioxide and depleted in ammonia is directed for use in step c), for removal of ammonia from the carbon dioxide depleted gas stream. Step a) and c) are thus in liquid connection, and the liquids used in these steps are recirculated between the steps.

In step b), the major part of the carbon dioxide content of the gas stream is removed from the gas stream. Carbon dioxide removal is provided for by absorption of carbon dioxide into one, or more, ammoniated liquid(s) in one, or more, $CO_2$ absorption stage(s). This step is also generally referred to as the absorption stage(s) of the $CO_2$ removal process.

In step c), the ammonia enriched gas stream from the $CO_2$ absorption stage is brought into contact with the liquid enriched in carbon dioxide resulting from step a). This enables absorption of ammonia into the liquid and results in a gas stream which may be released from, for example, a process plant, depleted not only in carbon dioxide but also in ammonia. Hence, the gas stream is very effectively cleaned, from both carbon dioxide and ammonia, such that the gas stream may subsequently be released to the atmosphere without negative effects on the environment, or on human health.

The liquid enriched in carbon dioxide used in step c) initially has a low ammonia content. The liquid however becomes enriched in ammonia upon contact with the gas stream and subsequently forms the first ammoniated liquid, which is directed for use in step a). Any precipitated solids may be removed before the liquid is directed to step a).

Usually, a gas enriched in ammonia leaving the $CO_2$ absorption stage(s) corresponding to step b) has to be subjected to a water wash in order to remove ammonia. In other words, water wash is needed in order to provide a gas stream with a low enough content of ammonia to be released to the atmosphere. However, in the process as presented above, the water wash becomes superfluous and may as such be excluded, since the process as such already provides for efficient ammonia removal. As a consequence of the exclusion of a water wash step, this process moreover eliminates the need for separation of ammonia, e.g. ammonia stripping, from the water used in the water wash, since no water wash is needed. Thus, in this process, the gas stream enriched in ammonia formed in step b) is passed directly to step c) without being subjected to intermediate washing. The capital costs of a process as described above are thus reduced as compared to a conventional process. In addition, carbon dioxide is efficiently removed from the gas stream without causing emissions of other substances, such as ammonia, to the environment.

The concentrations of ammonia and carbon dioxide in the liquid recirculated between steps a) and c) are characterized by a R-value that represents the concentration ratio of ammonia to carbon dioxide in the liquid. Initially, the first ammoniated liquid directed for use in step a) may have a R-value in the range of 2.0 to 3.0. As carbon dioxide is absorbed into the first ammoniated liquid, the R-value of the liquid decreases to form the liquid enriched in carbon dioxide having a R-value of 1.5 to 1.9. When ammonia is absorbed into the liquid enriched in carbon dioxide in step c), the R-value of the liquid enriched in carbon dioxide initially is in the range of 1.5 to 1.9, but increases to form the first ammoniated liquid in step c) that may have a R-value in the range of 2.0 to 3.0 as described above.

According to one embodiment, step a) provides a partial removal of carbon dioxide from the gas stream of between 1 and 10%.

According to one embodiment, the temperature of the gas stream containing carbon dioxide is, prior to step a), adjusted to a temperature in the range of, for example, 0-20° C., such as 0-10° C., and such as of below 5° C. At a temperature of below 5° C., ammonium bicarbonate solids may be precipitated by contacting the gas stream with the liquid in step a), which produces a slurry solution enriched in carbon dioxide. The gas temperature may for example be adjusted by contacting the gas stream with a cooling liquid, which has a relatively lower temperature than the gas stream, which allows transfer of heat from the gas stream to the cooling liquid.

In one embodiment, the gas stream may be pre-conditioned prior to the process steps as defined above. Such pre-conditioning or pre-cleaning may for example involve removal of any acid gases contained in the gas stream. This may for example be accomplished by contacting the gas stream with a pre-conditioning liquid, such as an alkali based cleaning liquid, to absorb into the pre-conditioning liquid at least a part of the acid gases contained in the gas stream, to form a gas stream depleted in other acid gases and a liquid enriched in dissolved acid gases.

According to one embodiment, there is provided a process as described above further comprising d) removing, at least a part of, the ammonia of the gas stream by bringing the gas stream at least partly depleted in ammonia from step c) into contact with a post-conditioning liquid, to absorb into the liquid ammonia from the gas stream, such that a gas stream depleted in ammonia and a liquid enriched in ammonia are formed. Thus, in a post-conditioning or post-cleaning step following step c), further ammonia removal is provided for by contacting the gas stream with a post-conditioning liquid, such as sulfuric acid or other suitable acid, to form a liquid enriched in ammonia, such as ammonium sulfate. The post-conditioning liquid may have a low pH, such as a pH of below 5, such as a pH of between 4 and 5.

In some embodiments, the process further comprises e) heating the gas stream by bringing the gas stream depleted in ammonia from d) into contact with a heating liquid, to form a heated gas stream for release to stack.

The drawbacks and deficiencies of the prior art are also overcome or alleviated by, in a second aspect, a gas cleaning system for cleaning a gas stream containing carbon dioxide, comprising a pre-conditioning stage arranged to receive and clean the gas stream;

a carbon dioxide removal stage, located downstream of the pre-conditioning stage with respect to the flow direction of the gas stream, which is arranged to remove carbon dioxide from the gas stream;

a post-conditioning stage, located downstream of the carbon dioxide removal stage with respect to the flow direction of the gas stream, which is arranged to clean the gas stream;

the pre-conditioning stage comprises at least a first gas-liquid contacting device which is arranged upstream of the carbon dioxide removal stage, with respect to the flow direction of the gas stream, wherein the first gas-liquid contacting device is arranged to partly remove carbon dioxide from the gas stream by bringing it into contact with a first ammoniated liquid, such that a liquid enriched in carbon dioxide is formed;

the carbon dioxide removal stage comprises a carbon dioxide absorber vessel arranged to receive the gas stream from the gas-liquid contacting device of the pre-conditioning stage arranged upstream of the carbon dioxide removal stage, and to remove carbon dioxide from the gas stream by bringing the gas stream into contact with at least a second ammoniated liquid, such that a carbon dioxide depleted gas stream enriched in ammonia is formed;

the post-conditioning stage comprises at least a first gas-liquid contacting device which is arranged downstream of the carbon dioxide removal stage, with respect to the flow direction of the gas stream, wherein the first gas-liquid contacting device is arranged to receive the carbon dioxide depleted gas stream enriched in ammonia from the absorber vessel and to partly remove ammonia from the gas stream by bringing the gas stream into contact with the liquid enriched in carbon dioxide, such that the first ammoniated liquid is formed;

wherein the first gas-liquid contacting device of the pre-conditioning stage is arranged in liquid connection with the first gas-liquid contacting device of the post-conditioning stage, such that at least a portion of the liquid used in the first gas-liquid contacting device of the pre-conditioning stage is directed for use in the first gas-liquid contacting device of the post-conditioning stage and at least a portion of the liquid used in the first gas-liquid contacting device of the post-conditioning stage is directed for use in the first gas-liquid contacting device of the pre-conditioning stage.

The gas cleaning system as described above provides for recirculation of liquid between the first gas-liquid contacting device of the pre-conditioning stage and the first gas-liquid contacting device of the post-conditioning stage. The two gas-liquid contacting devices thus function as absorbers for carbon dioxide and ammonia, respectively. The gas cleaning system consequently provides for efficient removal of contaminants from the gas stream. In addition, capital expenses may be reduced since the system as described above eliminates the need for a separate water wash vessel and an ammonia water stripping column.

Accordingly, in one embodiment of a system as described above, the carbon dioxide absorber vessel is arranged to feed the carbon dioxide depleted gas stream enriched in ammonia directly to the first gas-liquid contacting device of the post-conditioning stage. Thus, the carbon dioxide depleted gas stream enriched in ammonia formed in the vessel is fed to the post-conditioning stage without passing any intermediate wash vessel.

By contacting the gas stream containing carbon dioxide with the first ammoniated liquid in the first gas-liquid contacting device of the pre-conditioning stage, carbon dioxide is absorbed into the ammoniated liquid and, as a result, solids, such as ammonium bicarbonate resulting from the reaction of dissolved carbon dioxide with ammonia, may form. According to one embodiment, the first gas-liquid contacting device of the pre-conditioning stage is therefore a mass transfer device adapted for handling of solids without plugging. The amount of absorbed carbon dioxide may be controlled by the choice of mass transfer device. For the same reason, the first gas-liquid contacting device of the post-conditioning stage may be a mass transfer device adapted for handling of solids to avoid plugging. Each of the first gas-liquid contacting devices may independently consist of an open spray tower or a (set of) sieve tray(s).

According to one embodiment, the pre-conditioning stage comprises a second gas-liquid contacting device which is arranged upstream of the first gas-liquid contacting device of the pre-conditioning stage, wherein the second gas-liquid contacting device is arranged to cool the gas stream by bringing it into contact with a cooling liquid. The second gas-liquid contacting device is thus arranged to cool the gas stream, for example to a temperature in the range of 0-20° C., such as 0-10° C., and such as of below 5° C., and to discharge a cooled gas stream that may be passed directly, or via yet another gas-liquid contacting device, to the first gas-liquid contacting device of the pre-conditioning stage. The second gas-liquid contacting device functions as a heat exchanger, by enabling heat transfer from the hot gas stream to the cool liquid. Should the pre-conditioning stage comprise further gas-liquid contacting devices for further cooling of the gas stream, such further cooling may for example be achieved by mechanical chilling. In such cases, the temperature of the gas stream may be in the above temperature ranges after passing all of the gas-liquid contacting devices for cooling of the gas stream.

In embodiments where the gas stream further contains other acid gases, the second gas-liquid contacting device of the pre-conditioning stage may optionally be arranged to provide removal of such acid gases by bringing the gas stream into contact with a pre-conditioning liquid. The pre-conditioning liquid may be the same as or different from the cooling liquid.

According to one embodiment, the post-conditioning stage comprises a second gas-liquid contacting device which is arranged downstream of the first gas-liquid contacting device of the post-conditioning stage, wherein the second gas-liquid contacting device is arranged to receive the gas stream from the first gas-liquid contacting device of the post-conditioning stage and to further remove, at least a part of, the ammonia from the gas stream by bringing it into contact with a post-conditioning liquid, such as sulfuric acid or other suitable acid. By having two or more gas-liquid contacting devices in the post-conditioning stage, removal of ammonia may be improved, and the second gas-liquid contacting device is thus arranged to discharge a gas stream further depleted in ammonia.

According to another embodiment, the post-conditioning stage comprises a third gas-liquid contacting device, arranged downstream of the second gas-liquid contacting device. This third gas-liquid contacting device may be arranged to heat the gas stream before releasing it to stack.

Thus, the gas cleaning system as herein described provides for efficient removal of contaminants, such as carbon dioxide, ammonia and optionally acid gases from the gas stream, at a relatively low cost, since equipment traditionally used for ammonia removal from e.g. wash water is not needed.

With regard to the description above of a gas cleaning system, it is to be noted that the designation of first, second and third gas-liquid contacting devices is made for clarity reasons to distinguish between individual gas-liquid contacting devices with different functions. These designations are not intended to refer to the actual order of the individual devices in the pre- and post-conditioning stages, and it is therefore to be understood that in embodiments where the pre-conditioning and/or the post-conditioning stage of the gas cleaning system comprise a second and/or a third gas-liquid contacting device, if nothing else is indicated, these may be arranged in any order with respect to each other. The order is instead defined by the relative position of the devices, i.e. "upstream", "downstream", with respect to each other and with respect to the flow direction of the gas stream.

Further objects and features of the present invention will be apparent from the detailed description and the claims.

BRIEF DESCRIPTION OF THE FIGURES

Referring now to the Figures, which are exemplary embodiments, and wherein the like elements are numbered alike.

DETAILED DESCRIPTION

As used throughout the present disclosure, the unit "ppm" refers to parts per million on a volume basis.

As described in US 2008/0178733, the gas cleaning system may for example be useful in a power plant in which combustion of a fuel takes place in a boiler. During the combustion of a fuel, such as coal or oil, a hot process gas, often referred to as a flue gas, is generated. In a system as described in US 2008/0178733, the flue gas, which contains polluting substances, including dust particles, carbon dioxide, $CO_2$, sulfur dioxide, $SO_2$, and sulfur trioxide, $SO_3$, leaves the boiler via a gas duct. The gas duct is operative for forwarding the flue gas to a conventional air pollution control system. The conventional air pollution control system may, depending on the source of the gas, include a dust collector, a $NO_x$ and $SO_2$ control, an acid mist capturing device, a sulfur dioxide removal device, sometimes referred to as a Flue Gas Desulfurization system (FGD), and more. In such a wet or dry scrubber, the sulfur dioxide is removed from the flue gas by means of contacting the flue gas with a limestone or lime based slurry or other alkali based liquid. The flue gas leaving such a conventional air pollution system, including a sulfur dioxide removal device, typically contains less than 200 ppm of $SO_2$, has a temperature of 40-70° C., and is at ambient pressure. The flue gas leaving the conventional air pollution system may moreover be saturated with water depending on the scrubbing method used.

Figure 1:
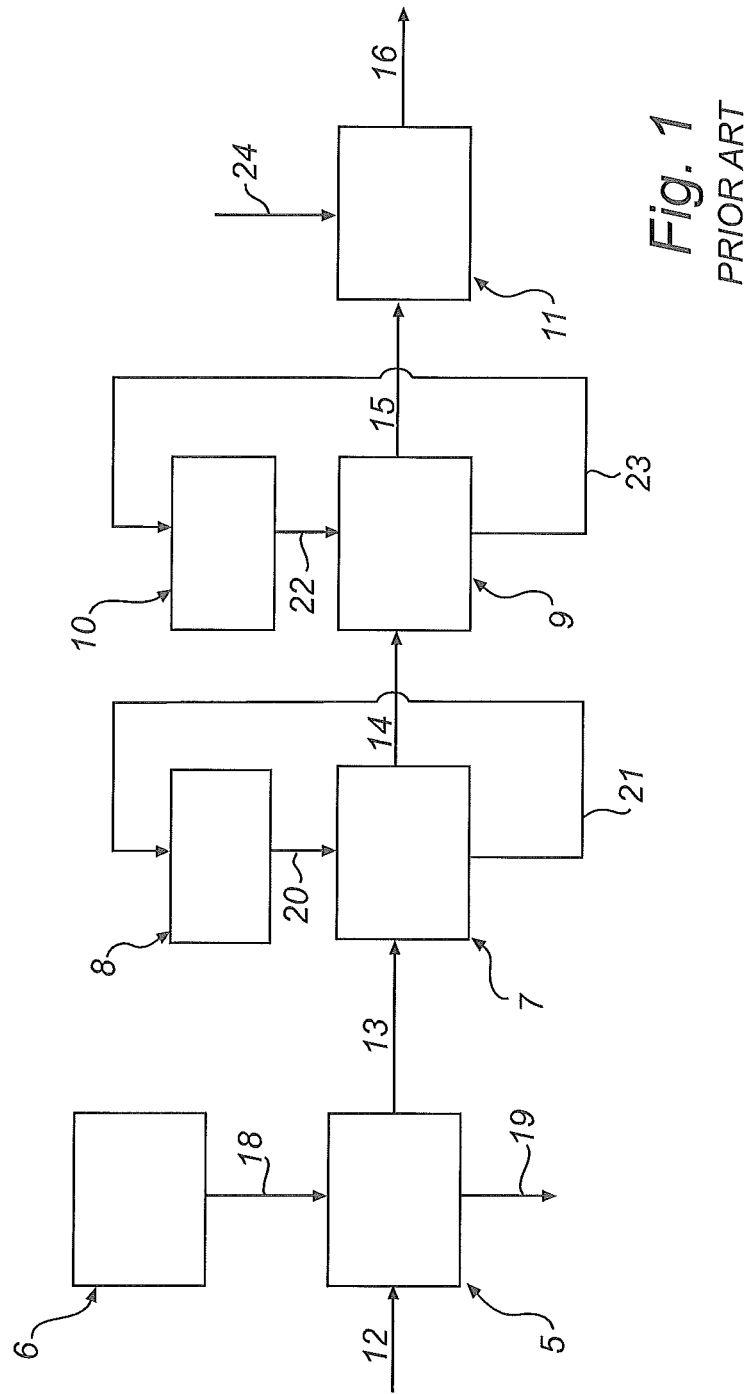
FIG. 1 is schematic representation of a conventional gas cleaning system.

FIG. 1 is a schematic representation of a conventional gas cleaning system, essentially a system as described in WO 2006/022885. Flue gas from a combustion or an industrial process containing residual contaminants, $CO_2$ and inert gas species is via duct 12 forwarded to subsystem 5. The $CO_2$ concentration of the gas is typically 9-15% for coal combustion and 3-4% for natural gas combustion. Before being fed to system 5, the gas stream may optionally pass one or more conventional air pollution control systems (not shown) as described above. The system 5 is a series of one or more Direct Contact Coolers (DCC), where cold water 18 generated in cooling towers and chillers 6 is used to wash and scrub the flue gas, capture its residual contaminants and lower its moisture content. The flue gas entering the DCC is typically water saturated, or above saturation in the case of dry FGD, and in the temperature range of 40-85° C. Stream 19 is a bleed from DCC 5 designed to purge all the residual contaminants captured.

The resulting cooled flue gas is suitable for $CO_2$ capture and is via duct 13 supplied to the $CO_2$ absorber 7. The $CO_2$ absorber 7 may comprise a series of absorber systems, depending on the removal efficiency required and the operating conditions of the plant. Carbon dioxide is captured from the flue gas by absorption into a cooled $CO_2$-lean ammoniated liquid 20 from the regenerator 8. The resultant stream 21 is a $CO_2$ enriched ammoniated liquid sent for regeneration.

The regenerator 8 operates at high pressure and elevated temperature and may be a single or a series of regeneration reactors. The pressure of the ammoniated liquid fed to the regenerator is elevated using a high pressure pump (not shown) and heat is provided to the regenerator by a heater (not shown). The high pressure and high temperature in the regenerator cause the release of high-pressure gaseous $CO_2$.

The clean gas with low $CO_2$ concentration contains a minor amount of absorbed ammonia and is via duct 14 passed to a water wash vessel 9 for ammonia removal. A cold ammoniated water solution is via pipe 22 supplied to the water wash vessel. The resultant solution enriched in ammonia is via pipe 23 sent for cleaning in an ammonia water stripping column 10.

The clean gas depleted in $CO_2$ and ammonia is via duct 15 forwarded to one or more Direct Contact Heater(s) (DCH) 11, which is/are operative for further cleaning and heating of the gas stream and for releasing a heated gas stream via duct 16 to the atmosphere. A heated liquid stream, supplied via pipe 24, is used for heating the gas stream in the DCH.

Figure 2A:
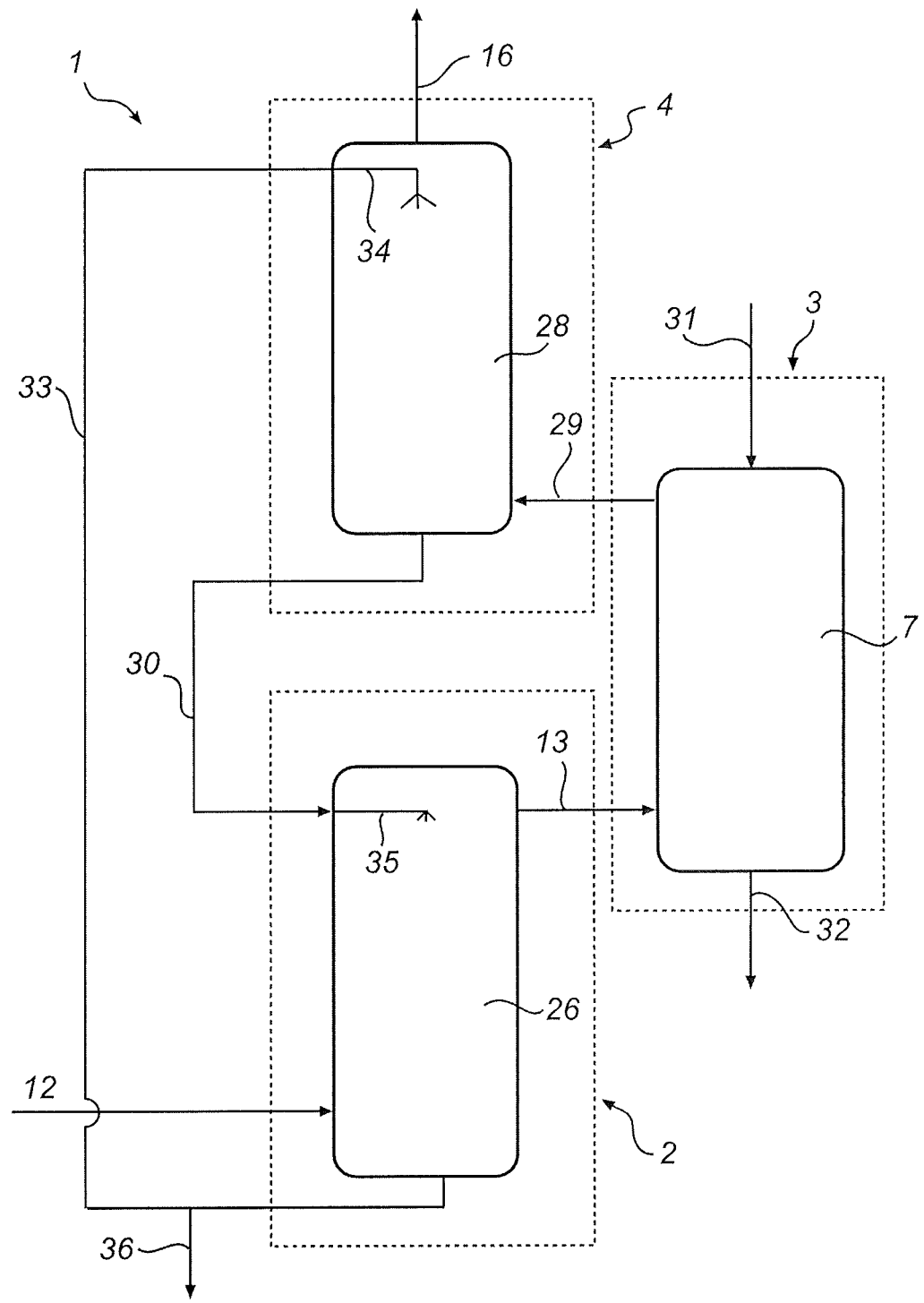
FIG. 2a is a schematic representation depicting an example of a gas cleaning system.

FIG. 2*a* is a schematic representation of an example of a gas cleaning system 1 according to the present disclosure. The system comprises a pre-conditioning stage 2, a $CO_2$ removal stage 3, also generally referred to as a $CO_2$ absorption stage, and a post-conditioning stage 4. The pre- and post-conditioning stages are arranged in liquid connection such that liquid used in one of the stages may be reused in the other stage as explained below.

The pre- and post-conditioning stages each comprise at least one gas-liquid contacting device. The gas-liquid contacting device(s) of the pre-conditioning stage may also be referred to as Direct Contact Cooler(s) (DCC), and the gas-liquid contacting device(s) of the post-conditioning stage may be referred to as Direct Contact Heater(s) (DCH).

The gas-liquid contacting devices of the pre- and post-conditioning stages may be integrated in vessels comprising more than one gas-liquid contacting device arranged in sequence, such that a flue gas stream which is fed to the vessel enters and exits each gas-liquid contacting device in sequence, before exiting the vessel. Such integrated vessels may reduce capital costs for vessels and foundations, and require a smaller footprint on the plant site.

Alternatively, each of the gas-liquid contacting devices of the pre- and post-conditioning stages may independently be arranged as separate gas-liquid contacting vessels connected in series, such that the flue gas stream enters and exits each gas-liquid contacting vessel in sequence.

Each gas-liquid contacting device is arranged to bring the gas stream into contact with a liquid. The contacting may be performed in counter current flow such that the gas enters the gas-liquid contacting device at one end (typically at the bottom) and the liquid solution enters the gas-liquid contacting device at the other end (typically at the top).

Liquid used in one gas-liquid contacting device is generally at least partly collected at the bottom of the gas-liquid contacting device or in a separate buffer or storage tank in liquid connection with the bottom of the gas-liquid contacting device, such that liquid exiting the gas-liquid contacting device is collected therein. In an integrated vessel as described above, liquid may be collected and withdrawn from one gas-liquid contacting device and optionally redirected to the same or another gas-liquid contacting device, located upstream or downstream of the first device.

The flue gas is forwarded in the opposite direction and may pass through or alongside the collected liquid. In this case, a liquid collection receptacle may be arranged in between two gas-liquid contacting devices, whether arranged separately or integrated, and may, for example, comprise a sloped collection tray or bubble cap tray. Such liquid collection receptacles may further comprise one or more liquid outlets configured for removal of the collected liquid.

Prior to being fed to the pre-conditioning stage of FIG. 2*a*, the flue gas may optionally be processed in a conventional air pollution control system, such as a sulfur dioxide removal device, as described above.

The pre-conditioning stage 2 of FIG. 2*a* comprises at least a first gas-liquid contacting device 26 for cleaning flue gas, arranged directly upstream of the $CO_2$ removal stage with reference to the flow direction of the flue gas stream. In the contacting device 26, flue gas, having a temperature of, for example, 0-20° C., is contacted with a first ammoniated liquid supplied via pipe 30. A set of nozzles 35, or pipes with holes for liquid distribution, is arranged to distribute the ammoniated liquid, having a temperature of, for example, 0-25° C., over the device 26, which has the form of an open spray tower or sieve trays. The flue gas enters the bottom part of the first gas-liquid contacting device via a gas inlet and is forwarded upwards through the device 26.

By contacting the flue gas with an ammoniated liquid in the first gas-liquid contacting device 26, a portion of the $CO_2$ content of the flue gas is absorbed into the ammoniated liquid, initially having a low $CO_2$ content, to form a liquid, such as a slurry or a solution, enriched in dissolved $CO_2$ and depleted in ammonia. If needed, the concentration of ammonia in the ammoniated liquid may be adjusted in such a way as to allow formation, e.g. of ammonium bicarbonate, and precipitation, e.g. of ammonium bicarbonate, solids upon reaction with the carbon dioxide dissolved in the liquid. The ammonia concentration may be adjusted by, for example, 1) direct injection of ammonia, 2) adjustment of $CO_2$-lean solution injection from the regeneration stage (not shown) of the $CO_2$ removal stage, 3) adjustment of the ammonia content in the flue gas leaving the $CO_2$ removal stage, or 4) operation of the first ammoniated liquid at suitably low temperature. The portion of carbon dioxide removed from the flue gas is linked to the R-value of the ammoniated liquid, which in turn is linked to the amount of ammonia enriched in the gas stream resulting from the $CO_2$ removal stage, but is mainly due to the operation conditions of the regenerator (not shown) of the $CO_2$ removal stage and the R-value of the $CO_2$-lean solution resulting from regenerator, the flue gas temperature, and the liquid-to gas ratio of the $CO_2$ removal stage. For example, less than 10%, such as 6-8%, of the total $CO_2$ content of the flue gas is absorbed into the ammoniated liquid. A higher degree of $CO_2$ removal in the first gas-liquid contacting device, i.e. a higher content of dissolved $CO_2$ in the liquid resulting from the gas-liquid contacting device 26, may provide for increased removal of ammonia from the gas stream in the post-conditioning stage, i.e. in the first gas-liquid contacting device of the post-conditioning stage.

The liquid enriched in carbon dioxide resulting from the first gas-liquid contacting device 26 has a low R-value. This liquid is collected, for example in a buffer tank at the bottom of the device 26, withdrawn from the device 26, and forwarded to the post-conditioning stage via pipe 33. A bleed stream 36 is arranged to take care of solids precipitated, e.g. ammonium bicarbonate, in the gas-liquid contacting device. The bleed stream is directed to a tank and subsequently, in combination with the solids produced in the $CO_2$ absorber, sent for regeneration (not shown). The liquid enriched in carbon dioxide 33 optionally passes a heat exchanger for controlling the temperature (not shown).

The pre-conditioning stage thus provides a gas stream partly depleted in $CO_2$ for supply via duct 13 to the $CO_2$ removal stage 3. The $CO_2$ removal stage is rather similar to the carbon dioxide removal stage described in WO 2006/022885. The type of carbon dioxide removal stage described in WO 2006/022885 is sometimes referred to as a Chilled Ammonia Process (CAP). A flue gas temperature of 0-25° C., such as 0-10° C., is suitable for the $CO_2$ removal stage 3.

The $CO_2$ removal stage 3 comprises a single $CO_2$ absorber vessel 7, or a series of $CO_2$ absorber vessels (not shown), in which the flue gas is brought into contact with an ammoniated liquid 31, and optionally further ammoniated liquids (not shown), in a similar manner as described in WO 2006/022885. The resulting $CO_2$-enriched slurry or solution 32 is passed, for example by means of a high pressure pump, from the absorber vessel(s) 7 to a regenerator (not shown). High pressure and high temperature in the regenerator causes the release of high-pressure gaseous $CO_2$. The $CO_2$-lean ammoniated liquid or slurry resulting from regeneration is cooled and reused in the $CO_2$ absorber 7 as stream 31.

It should be noted that an ammoniated liquid or solution used in the process or the system as herein described may also include a promoter. Such a promoter may be added in order to enhance the chemical reaction kinetics involved in the capture of $CO_2$ by the ammoniated liquid or solution. For example, the promoter may include an amine (e.g. piperazine) or an enzyme (e.g., carbonic anhydrase or its analogs), which may be in the form of a solution or immobilized on a solid or semi-solid surface.

A duct 29 is operative for forwarding flue gas, having a low concentration of $CO_2$, from the $CO_2$ absorber(s) 7 directly to the post-conditioning stage 4. Thus, no intermediate water wash vessel for ammonia removal from the gas stream is needed, which keeps the capital costs for the gas cleaning system at a lower level.

The post-conditioning stage 4 thus receives $CO_2$ depleted flue gas, having a temperature of, for example, 0-25° C., such as 0-5° C., and an ammonia content of, for example, 1000-100 000 ppm, such as 10 000 ppm, from the $CO_2$ removal stage 3. The post-conditioning stage comprises at least a first gas-liquid contacting device 28 which is arranged to receive the flue gas supplied via duct 29. The first gas-liquid contacting device 28 is arranged to, at least partly, remove ammonia from the flue gas by bringing the flue gas into contact with at least a portion of the liquid enriched in $CO_2$ resulting from the first gas-liquid contacting device 26 of the pre-conditioning stage. The liquid rich in carbon dioxide, having a temperature of, for example, 0-25° C., is via pipe 33, and optionally via a heat exchanger, forwarded to the top of the first gas-liquid contacting device 28. A set of nozzles 34, or pipes with holes for liquid distribution, is operative for distributing the liquid over the device 28. The flue gas enters at the bottom part of the device 28 and is forwarded upwards through the device 28. The first gas-liquid contacting device 28 is configured as an open spray tower or a set of sieve trays.

By contacting the flue gas from the $CO_2$ removal stage with a liquid containing dissolved carbon dioxide in the first gas-liquid contacting device 28 of the post-conditioning stage, ammonia is removed from the flue gas by absorption into the liquid. This increases the R-value of the liquid, which is collected and withdrawn from the first gas-liquid contacting device 28 and, at least partly, forwarded to the pre-conditioning stage 2 via pipe 30.

It should also be understood that the system as described above may be combined with prior art systems, e.g. a system as described in relation to FIG. 1. But by combination with the present system the water wash vessel 9 and stripper 10 may be excluded from the prior art system of FIG. 1.

Figure 2B:
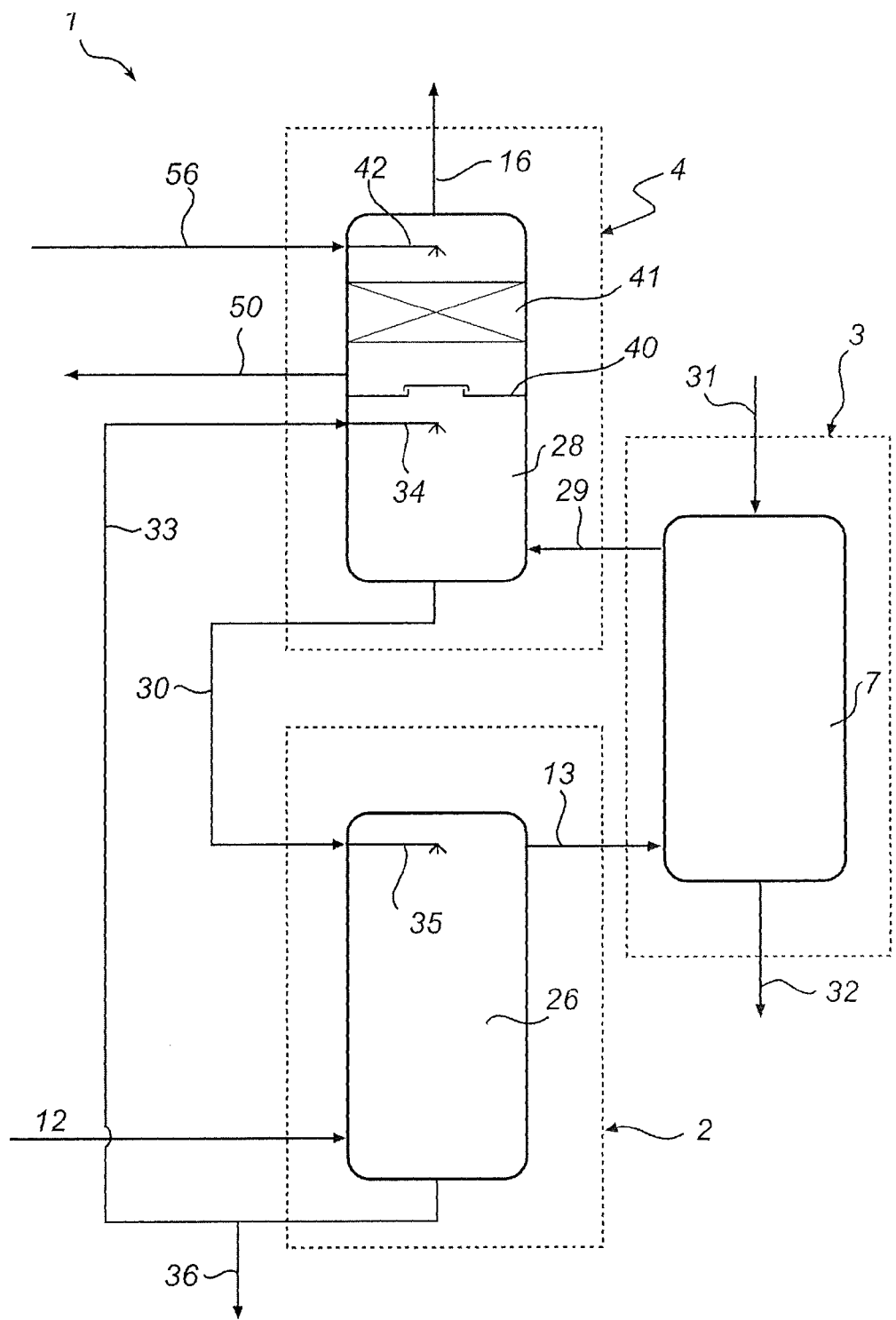
FIG. 2b is a schematic representation depicting an example of a gas cleaning system.

FIG. 2b is a schematic representation of an example of a gas cleaning system 1 as described herein. The system comprises a pre-conditioning stage 2, a $CO_2$ removal stage 3 and a post-conditioning stage 4, wherein the pre-conditioning stage 2 contains at least a first gas-liquid contacting device and the post-conditioning stage contains at least two gas-liquid contacting devices.

The flue gas, optionally processed in a conventional air pollution system as described above, enters the pre-conditioning stage 2 via the duct 12 and reaches the first gas-liquid contacting device 26 for removal of a part of its $CO_2$ content by absorption into an ammoniated liquid. The first gas-liquid contacting device 26 is arranged to function essentially as described in relation to FIG. 2a.

The flue gas partly depleted in $CO_2$ leaving the first contacting device 26 of the pre-conditioning stage 2 is passed to the $CO_2$ removal stage 3 via duct 13. As described above, the $CO_2$ removal stage comprises a single or a series of $CO_2$ absorber vessel(s) 7 in which the flue gas is brought into contact with one or more ammoniated liquid(s) 31 as described above and in a manner similar to that of WO 2006/022885.

The flue gas depleted in carbon dioxide leaving the $CO_2$ removal stage 3 is passed directly to the post-conditioning stage via duct 29. The post-conditioning stage 4 comprises a first 28 and a second gas-liquid contacting device 41. The gas-liquid contacting devices of the post-conditioning stage are arranged in sequence with respect to the flow direction of the flue gas stream.

The flue gas is passed to the first gas-liquid contacting device 28 of the post-conditioning stage for removal of ammonia by absorption into a liquid enriched in carbon dioxide. The contacting device 28 is arranged to function essentially as set forth in connection to FIG. 2a.

The flue gas leaving the first contacting device 28 passes through the liquid collection receptacle 40, in which the liquid used in the second contacting device 41 is collected, and reaches the second contacting device. The second contacting device 41 is arranged to, at least partly, remove residual ammonia from the flue gas. The flue gas, having a temperature of, for example, below 5° C. and containing, for example, 200-400 ppm of ammonia, is forwarded upwards in the second contacting device 41 and is directly contacted with a post-conditioning liquid supplied via pipe 56. The post-conditioning liquid has a pH of, for example, below 5. To control the pH of the post-conditioning liquid and to precipitate solids, sulfuric acid may be added. The liquid may be subjected to heat-exchanging to obtain a temperature of, for example, 5-25° C. before being supplied via pipe 56 to the second contacting device 41. A set of nozzles 42 or pipes with holes for liquid distribution is responsible for distributing the liquid over the second contacting device 41, containing a structured packing, or another suitable gas-liquid contacting filling. In the second contacting device 41, residual ammonia contained in the flue gas is removed from the flue gas by formation of ammonium sulfate upon reaction with sulfate contained in the liquid. The liquid used in the second contacting device is collected in receptacle 40 and withdrawn via pipe 50. The second contacting device 41 may also function as a heat transfer device being operative for heating the flue gas prior to releasing the flue gas to the atmosphere. A gas outlet is connected to duct 16, which is arranged to forward the cleaned flue gas from the gas cleaning system 1 to stack.

In a gas cleaning system according to the example of FIG. 2b, $CO_2$ and $NH_3$ removal may be optimized simultaneously. For environmental reasons and in order to reduce ammonia losses from the system, the ammonia concentration of the flue gas discharged to the atmosphere should be lower than 10 ppm, such as lower than 2 ppm. This can be achieved by a gas cleaning system having a configuration as described above.

Figure 2C:
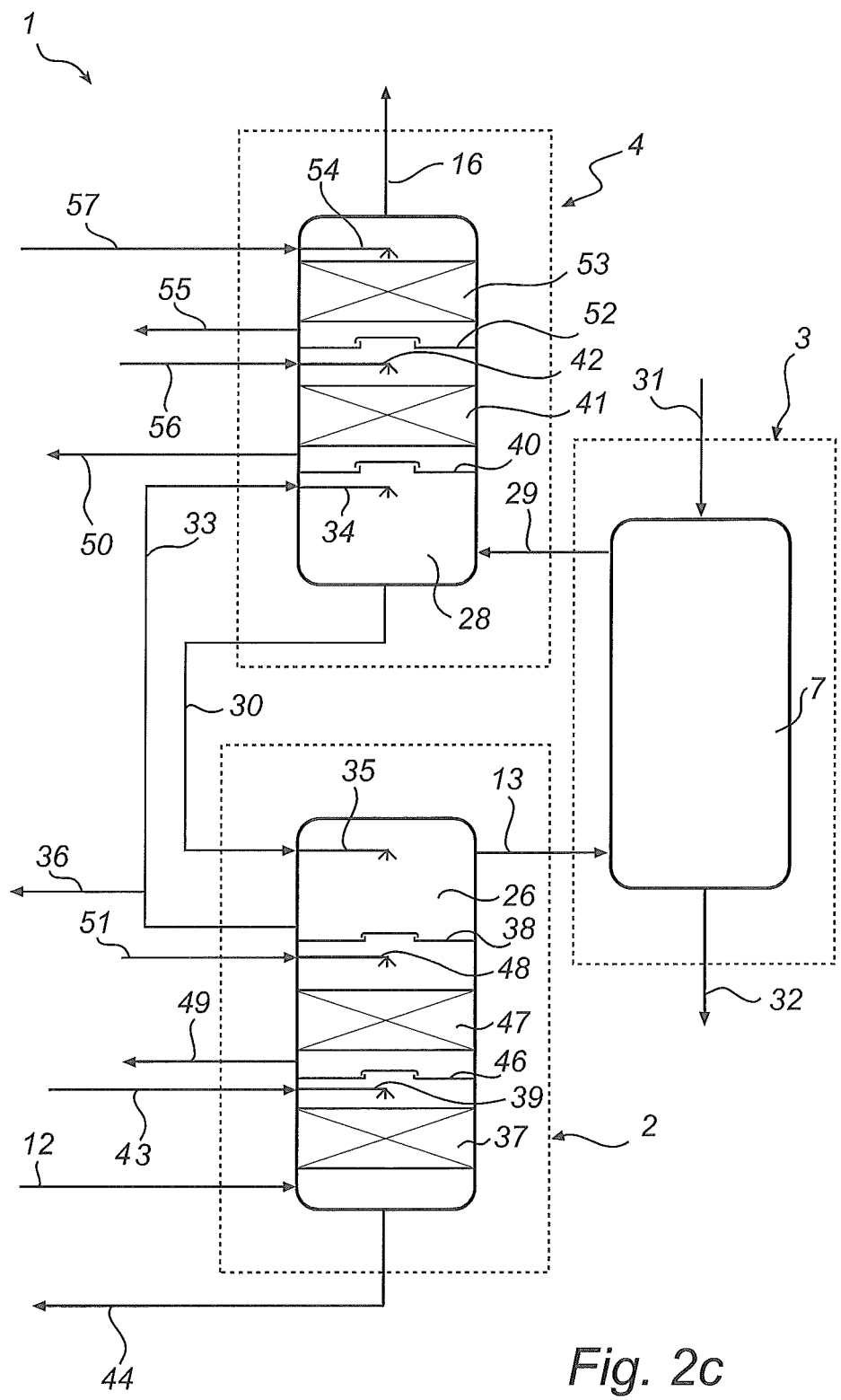
FIG. 2c is a schematic representation depicting an example of a gas cleaning system.

FIG. 2c is a schematic representation of an example of a gas cleaning system. The gas cleaning system 1 of FIG. 2c comprises a pre-conditioning stage 2, a $CO_2$ removal stage 3 and a post-conditioning stage 4. Each of the pre- and post-conditioning stages comprises at least three gas-liquid contacting devices for bringing flue gas into contact with liquids.

The pre-conditioning stage 2 thus comprises at least three gas-liquid contacting devices arranged in sequence with respect to the flow direction of the flue gas. The third gas-liquid contacting device 37, consisting of a structured packing, or another suitable gas-liquid contacting filling, is arranged to receive flue gas, optionally processed in a conventional air pollution system, via duct 12. In the third contacting device 37, the flue gas is contacted with a cool pre-conditioning liquid, having a temperature of, for example, 20° C., supplied via pipe 43 and distributed by a set of nozzles 39 or pipes with holes for liquid distribution. The incoming flue gas, having a temperature of, for example, 70° C., contains other acid gases, such as residual sulfur dioxide, $SO_2$, sulfur trioxide, $SO_3$, hydrogen chloride, HCl, and hydrogen fluoride, HF. Depending of course on the concentration of acid gases in the incoming flue gas, a major part of the acid gases contained in the flue gas will in general be captured in the third contacting device 37 by absorption into an alkaline-based pre-conditioning liquid.

The warm liquid leaving the third contacting device 37 via pipe 44 may optionally be utilized, for example for heating and/or removal of ammonia from the flue gas, in a gas-liquid contacting device of the post-conditioning stage 4, such as in the third gas-liquid contacting device 53.

The cooled flue gas depleted in acid gases leaving the third contacting device 37 enters the second gas-liquid contacting device 47 via the liquid collection receptacle 46. The flue gas thus passes through the liquid used in the second contacting device before reaching the second contacting device 47. In the second contacting device, consisting of a structured packing or another suitable gas-liquid contacting filling, the flue gas is contacted with a another cooling liquid. The cooling liquid, having a temperature of, for example, 5° C. and consisting essentially of water, is supplied via pipe 51 and distributed by a set of nozzles 48 or pipes with holes for liquid distribution over the contacting device. The second contacting device 47 thus functions as a heat transfer device by transferring heat from the flue gas to the initially cool liquid. The warm liquid formed in the second contacting device 47 is collected in a liquid collection receptacle 46 prior to being withdrawn via pipe 49. In addition, the second contacting device may allow condensation of water contained in the flue gas.

The warm liquid 49 may optionally be cooled by heat-exchanging and reused once again in the second contacting device 47.

Flue gas leaving the second contacting device 47 enters the first contacting device 26 via the liquid collection receptacle 38. The first contacting device is configured to remove part of the $CO_2$ from the flue gas essentially in the same way as described in connection with FIG. 2a

As such the pre-conditioning stage 2 of FIG. 2c serves to cool the flue gas supplied via duct 12, to remove acid gases and a portion of carbon dioxide from the flue gas, and to generate used liquid streams which may be directed for further use in the pre- and/or post-conditioning stage(s).

In the $CO_2$ removal stage 3, $CO_2$ is removed from the flue gas in one or more $CO_2$ absorber(s) 7 as set forth in connection with FIG. 2a.

The flue gas depleted in $CO_2$ leaving the $CO_2$ removal stage is passed to the post-conditioning stage 4 via duct 29. The flue gas enters the first gas-liquid contacting device 28 of the post-conditioning stage, which is configured for ammonia removal essentially in the same way as described in connection with FIG. 2a.

The flue gas, from which ammonia has been removed in the first gas-liquid contacting device 28, passes through the liquid collected in the liquid collection receptacle 40 and reaches the second gas-liquid contacting device 41. The second contacting device 41, configured to remove residual ammonia from the flue gas, is arranged essentially as described in connection with FIG. 2b.

Flue gas, which has been depleted in ammonia in the second gas-liquid contacting device 41, enters the third gas-liquid contacting device 53 of the post-conditioning stage 4, by passing via the liquid collection receptacle 52. The liquid collection receptacle contains the liquid used in the third contacting device 53. The third contacting device 53 is arranged to heat the flue gas before releasing it to stack. The flue gas is forwarded upwards in the contacting device 53, consisting of a structured packing, or another suitable gas-liquid contacting filling, where it is directly contacted with a heating liquid supplied via pipe 57. A set of nozzles 54 or pipes with holes for liquid distribution is operative for distributing the liquid, having a temperature of, for example 50° C., over the third contacting device 53.

The warm liquid supplied via pipe 57 may, as described above, result from the third gas-liquid contacting device 37 of the pre-conditioning stage 2.

The liquid collected in liquid collection receptacle 52 at the bottom of the third gas-liquid contacting device of the post-conditioning stage may be withdrawn via pipe 55 and reused, optionally after heat-exchanging, in another gas-liquid contacting device of the post-conditioning stage, such as the second gas-liquid contacting device 41.

Hence, the post-conditioning stage 4 serves to sequentially remove ammonia, $NH_3$, from the flue gas supplied via the duct 29, by utilizing the liquid stream enriched in $CO_2$ supplied via the pipe 33 and the post-conditioning liquid supplied via the pipe 56, and to heat the flue gas before releasing the gas to the atmosphere.

It is realized that a range of modifications to the described examples are possible. Each of the pre- and post-conditioning stages may, for example, independently of the other comprise one, two, three or four gas-liquid contacting devices. It is to be understood that further gas-liquid contacting devices may also be added to each of to the pre- and post-conditioning stages, as well as any additional connections for withdrawing and forwarding liquid to and from two gas-liquid contacting devices.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A process for cleaning a gas stream containing carbon dioxide, comprising:
   a) removing, in a at least a first gas-liquid contacting device, a part of the carbon dioxide contained in the gas stream by bringing the gas stream into contact with a first ammoniated liquid, to form a liquid enriched in carbon dioxide and a gas stream partly depleted in carbon dioxide;
   b) removing, in a $CO_2$ removal vessel, at least a part of, the carbon dioxide contained in the gas stream partly depleted in carbon dioxide by bringing the gas stream partly depleted in carbon dioxide leaving step a) into contact with at least a second ammoniated liquid, to form a carbon dioxide depleted gas stream enriched in ammonia; and
   c) removing, in at least a second gas-liquid contacting device, at least a part of, the ammonia of the carbon dioxide depleted gas stream enriched in ammonia by bringing the carbon dioxide depleted gas stream enriched in ammonia leaving step b) into contact with the liquid enriched in carbon dioxide formed in step a), to absorb, into the liquid, ammonia from the gas stream, such that a carbon dioxide depleted gas stream at least partly depleted in ammonia and a liquid enriched in ammonia are formed, wherein the liquid enriched in ammonia is the first ammoniated liquid used in step a);
   d) contacting, in the second gas-liquid contacting device, the carbon dioxide depleted gas stream at least partly depleted in ammonia prior with a heated liquid to form a heated gas stream; and
   e) releasing the heated as stream to the atmosphere.

2. The process according to claim 1, wherein the carbon dioxide depleted gas stream enriched in ammonia formed in step b) is passed directly to step c) without being subjected to intermediate washing.

3. The process according to claim 1, wherein the first ammoniated liquid formed in step c) has a R-value of 2.0 to 3.0.

4. The process according to claim 1, wherein step a) provides a partial removal of carbon dioxide from the gas stream of between 1 and 10%.

5. The process according to claim 4, wherein the liquid enriched in carbon dioxide formed in step a) has a R-value of 1.5 to 1.9.

6. The process according to claim 1, further comprising, prior to step a), adjusting the temperature of the gas stream containing carbon dioxide to a temperature of 0-20 C.

7. The process according to claim 1, further comprising, prior to step a), adjusting the temperature of the gas stream containing carbon dioxide to below 5° C.

8. The process according to claim 1, further comprising
   d) removing, in the post-conditioning stage, at least a part of, the ammonia of the carbon dioxide depleted gas stream at least partly depleted in ammonia by bringing the carbon dioxide depleted gas stream at least partly depleted in ammonia from step c) into contact with a post-conditioning liquid, to absorb, into the liquid, ammonia from the gas stream, such that a gas stream depleted in ammonia and a liquid enriched in ammonia are formed.

9. The process according to claim 8, wherein the post-conditioning liquid has a pH of equal to or less than 5.

10. The process according to claim 8, wherein the post-conditioning liquid comprises sulfuric acid.

11. The process according to claim 8, further comprising:
   heating, in the post-conditioning stage, the gas stream depleted in ammonia by bringing it into contact with a heating liquid to form a heated gas stream; and
   releasing the heated gas stream to the atmosphere.

* * * * *